Dec. 6, 1949  S. SESERMAN  2,490,603
VEHICLE WHEEL
Filed March 22, 1947  2 Sheets-Sheet 1

INVENTOR.
Samuel Seserman
BY
John H. McKenna
ATTORNEY

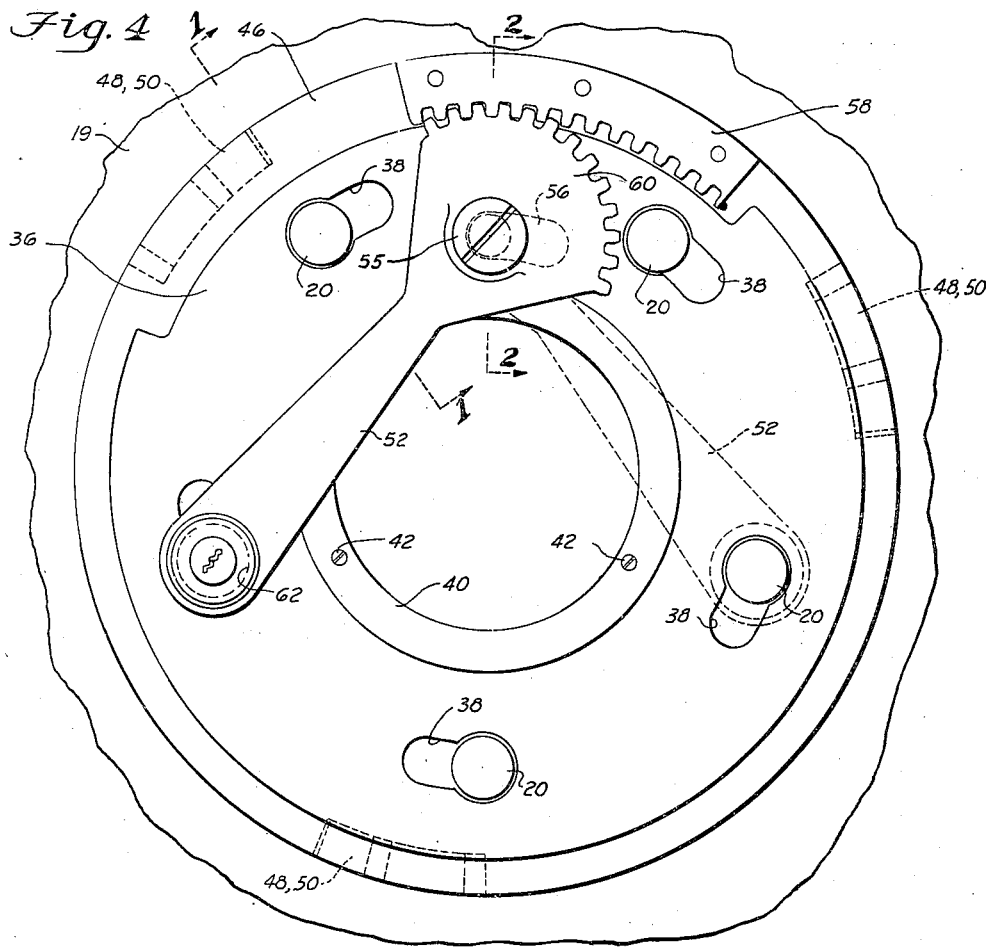
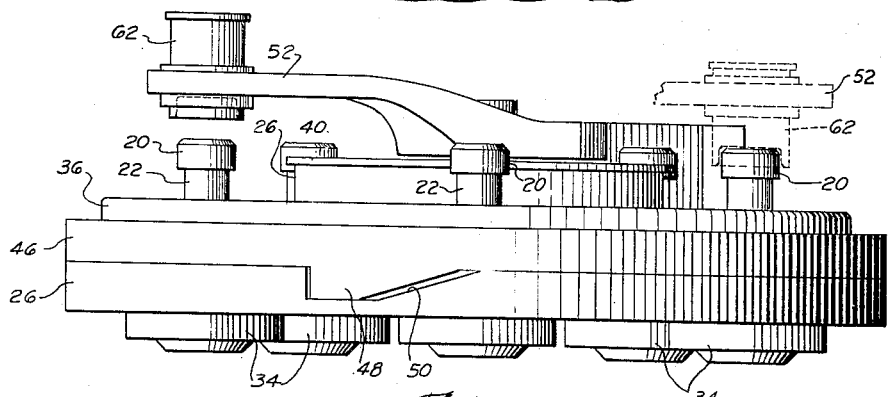

Patented Dec. 6, 1949

2,490,603

UNITED STATES PATENT OFFICE 2,490,603

VEHICLE WHEEL

Samuel Seserman, Dorchester, Mass.

Application March 22, 1947, Serial No. 736,475

10 Claims. (Cl. 301—9)

This invention relates to improvements in vehicle wheels and more especially to vehicle wheels having a hub section adapted to be secured on an axle, and a wheel body section which is mountable on and de-mountable from the hub section. The invention provides so that the wheel body quickly and easily may be mounted and de-mounted by reason of improved mechanism which locks the wheel body on the hub section and which assures against any accidental or unauthorized release of the locking means.

It is among the objects of the invention to provide a vehicle wheel having a wheel body which readily may be mounted on a hub section and be locked thereto by mere rotation of a locking ring which subsequently is secured in locking position by means which itself may be locked against release.

Another object is to provide a de-mountable wheel body on a hub section having a plurality of regions of securement around the wheel axis, and having means for effecting simultaneous securement of the wheel body on the hub section at said plurality of regions, and including a clamp which is effective at all of said regions simultaneously for assuring against accidental release of the securing means.

Yet another object is to provide a vehicle wheel having a hub section and a wheel body mountable on and de-mountable from the hub section, and having a locking ring for effecting a locking of the wheel body on the hub section by mere partial rotation of the locking ring, the ring itself being subsequently clamped against movement out of locking position.

A further object is to provide a sectional wheel including a hub section and a wheel body section of which the wheel body section is readily mountable on the hub section, and a locking ring is rotatable into locking engagement with the wheel body and portions of the hub section, there being manually operable leverage means for subsequently clamping the hub section, wheel body and locking ring rigidly together against relative movement.

It is, moreover, my purpose and object generally to improve the structure of vehicle wheels and more especially such wheels which have a wheel body removably mounted on a hub section of wheel.

In the accompanying drawings:

Fig. 4 is an elevational view of the central portion of the wheel of Fig. 1, on a larger scale, looking at the outer face thereof, with the locking ring in unlocked relation to the retaining studs and with the clamping means being also indicated by dotted lines in its clamping position; and Fig. 5 is a view looking at the lower edge of the mechanism of Fig. 4.

Figure 1:
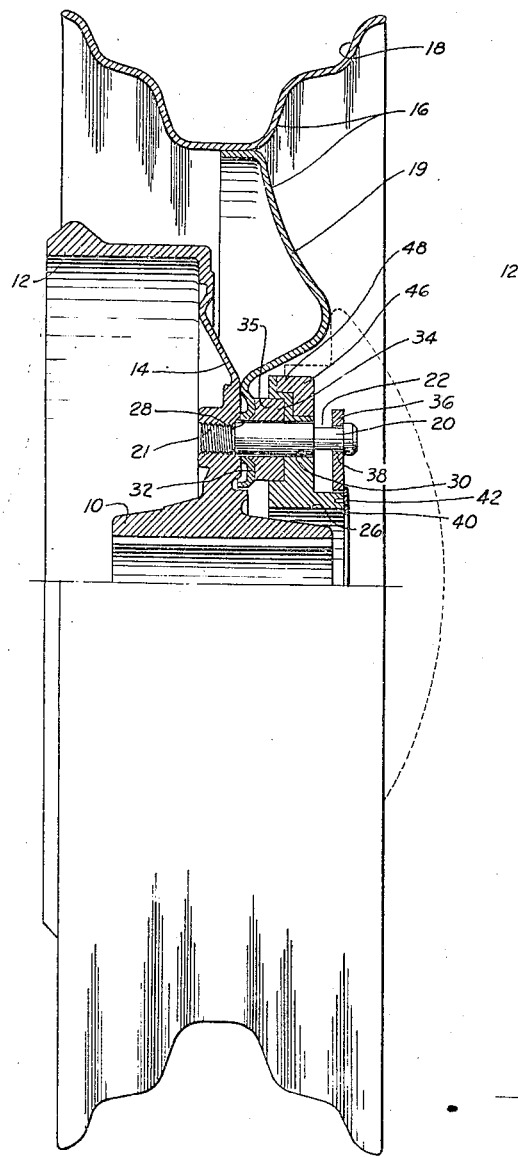
Fig. 1 is an edge elevation of a vehicle wheel embodying features of the invention, one-half of the wheel being in medial vertical cross-section on line 1—1 of Fig. 4.

Referring to the drawings, the invention is illustrated as it may be embodied in an automobile wheel having a hub 10 with the usual integral brake drum 12 thereon to whose outer wall 14 the body 16 of the wheel is removably secured. The hub 10 is adapted to be secured on an axle to rotate therewith in a customary manner, and the wheel body is mountable for rotation with the hub and brake drum, being readily removable therefrom as when it may be desirable or necessary to change a tire on the rim 18 of the wheel body.

According to the invention, the wheel body 16 is retained on the hub and brake drum by a series of studs 20 which coact with manually operable locking and clamping means for securely clamping the wheel body simultaneously at all of the studs so that the wheel body is maintained strongly pressed against the outer wall 14 of the brake drum as well as being positively held by the studs 20 against rotation on the hub and drum.

Referring to Figs. 1 and 4, each of the studs 20 is threaded at its inner end as at 21, for screwing into the outer wall 14 of the brake drum, and is annularly grooved at 22 near its outer end. The studs 20, having been screwed into wall 14, remain permanently therein as outwardly projecting fixed studs equally spaced apart around the hub 10.

The wheel 16 includes the annular web or disk 19 within and rigid with rim 18, the inner annular margin of web 19 having mounted thereon, as by screws 24 (Fig. 2), an annular stabilizing ring 26 whose interior diameter preferably is somewhat greater than the exterior dimensions of hub 10, so that ring 26 may fit the hub in spaced relation thereto.

Figure 2:
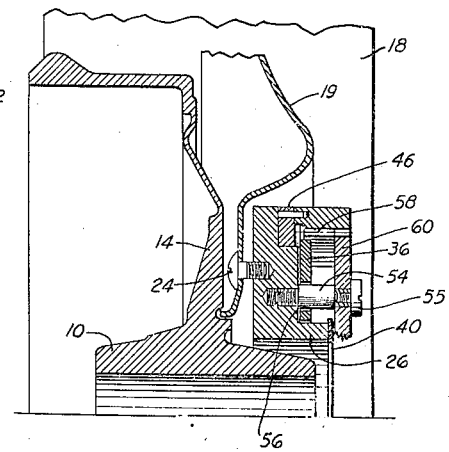
Fig. 2 is a fragmentary cross-sectional view on line 2—2 of Fig. 4.

As best seen in Fig. 1, the inner margin of web 19 and the stabilizing ring 26 have registering openings 28, 30 there-through for receiving the outwardly projecting studs 20, the inner margin of web 19 at each opening 28 preferably being formed with an out-set annular rib around the opening with walls tapering from the crest of the rib to the opening for reception of the tapered end of a collar 34 which is seated in an annular recess 35 at the inner side of stabilizing ring 26, there being a collar 34 coacting with each annular rib 32 at the location of each stud 20, five such locations being represented in Fig. 4. Referring to Fig. 2, the screws 24 which secure together the web 19 of the wheel body and the stabilizing ring 26, clamp the collars 34 securely between the stabilizing ring 26 and the annular ribs 32 on web 19 to provide a rigid unit.

When mounting the wheel body 16 on the hub and brake drum 10, 14, the wheel body is held with the openings 28, 30 opposite the studs 20, and then is thrust inward with studs 20 entering the openings 28, 30 and passing through the collars 34, each stud 20 ultimately projecting outward beyond the stabilizing ring 26 at the outer face of the wheel. A locking ring 36 is rotatably mounted on the outer side of stabilizing ring 26 and has bayonet slots 38 therein whose larger portions are adapted to receive the outer end portions of studs 20. Hence, before the wheel body is thrust inward on the studs 20, the larger portions of the bayonet slots 38 first are brought into register with the openings 30 in the stabilizing ring 26, as shown in Fig. 4. For this purpose, and also to permit a locking rotation thereof, the locking ring 36 is rotatably secured on the stabilizing ring by means of a retaining member 40 which may be secured to the stabilizing ring 26 in any suitable manner, as by the screws 42.

With the bayonet slots 38 properly aligned with openings 30 as above explained, the wheel body may be thrust inward on studs 20 until the inner margin of web 19 engages the outer wall 14 of the brake drum. The outer ends of the studs 20 now will be projected through the bayonet slots 38 of the locking ring 36. For the purpose of locking the ring on the studs, the annular groove 22 in the end portion of each stud 20 provides a stud portion of reduced diameter which can slidably fit in the smaller portion of a bayonet slot 38, and the reduced portions of the studs are positioned so that, when the wheel body is thrust inward against the brake drum wall 14, they will be opposite the locking ring 36. Hence a slight rotation of locking ring 36 in direction to bring the reduced portions of the studs into the smaller portions of the bayonet slots 38 will lock the wheel body against axial movement away from the wall 14 of the brake drum.

According to the invention, after the wheel body thus has been locked by the locking ring, the wheel body is pressed strongly inward against the drum wall 14 and the locking ring 36 simultaneously is pressed strongly outward against the outermost walls of the annular grooves 22 of studs 20 thereby to secure the locking ring 36 against any movement relative to the wheel body and the hub and brake drum and to effect a general rigidity of the composite wheel structure so long as said inward and outward pressures continue.

Figure 3:
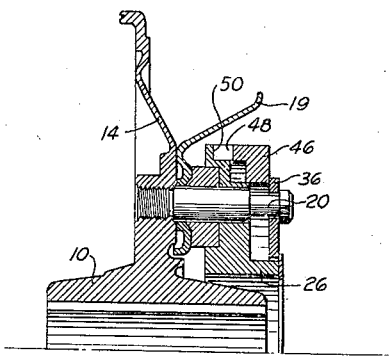
Fig. 3 is a fragmentary cross-sectional view similar to the cross-sectional portions of Fig. 1 but showing the clamping ring in clamping position.

In the embodiment herein represented, the inward and outward clamping pressures are attained by means of an annular cam member 46 which is mounted on the stabilizing ring 26 for both rotational and axial movements. The cam member 46 has a series of cam projections 48 at the inner side thereof for camming coaction with a series of cam grooves 50 in the adjacent wall of the stabilizing ring 26. The cam member 46 is located on the stabilizing ring 26 between the wall thereof having the cam grooves 50 and the locking ring 36 and, upon rotation of the cam member in one direction, the surfaces of the cam grooves 50 coact with the cam projections 48 on the cam member to force the latter outward into contact with said locking ring 36, and further rotation of the cam member, with further outward travel thereof, causes the locking ring to be thrust strongly against the outermost walls of the annular grooves 22 in studs 20, as shown in Fig. 3. Simultaneously, the stabilizing ring 26 and web 19 are forcibly thrust in the opposite direction to press the inner marginal portion of the web 19 into intimate contact with wall 14 of the brake drum.

Conveniently, the rotation of cam member 46 may be effected by a lever 52 pivoted on the stabilizing ring 26 by means of a pivot stud 54 which extends loosely through a slot 56 in the locking ring 36, as seen in Figs. 2 and 4, and on whose outer reduced end the lever 52 is rotatably secured by the screw 55. The cam member 46 has a rack 58 rigid thereon, and lever 52 has a gear segment 60 rigid therewith and in mesh with the teeth of rack 58.

In operation, the mounting of a wheel body on the hub and brake drum section of the wheel will proceed as already described by arranging the wheel body on the studs 20 and pushing it inward until the inner marginal portion of the web 19 engages the wall 14 of the brake drum, in which position the annularly grooved outer end portions of the studs will have been projected through the openings 28, 30 so that the grooves 22 of the studs stand opposite the locking ring 36. At this time, the lever 52 will be in its elevated full line position of Fig. 4, or in any other convenient position substantially swung clockwise from its dotted clamping position of Fig. 4, so that the clamping ring will be loose on studs 20. Hence, the locking ring 36 is free to be rotated counterclockwise in Fig. 4 to engage the reduced portions 22 of studs 20 in the smaller portions of the bayonet slots 38 for locking the wheel body against axial movement relative to the hub 10.

Next, the lever 52 is forced counter-clockwise in Fig. 4 thereby to rotate the cam member 46 counter-clockwise so that it is cammed outward by the coaction of the cam surfaces of cam grooves 50 in the stabilizing ring 26 and the cam projections 48 on the cam member 46. Continued counter-clockwise movement of the lever effects outward movement of the cam member 46 and the locking ring 36 until ring 36 is pressed forcibly against the outer walls of the annular grooves 22 of studs 20. This securely clamps the locking ring 36 against rotation on stabilizing ring 26 as the stabilizing ring 26 and web 19 simultaneously are forcibly cammed inward to thrust the inner marginal portion of the web into intimate contact with brake drum wall 14. The result is an extremely rigid composite wheel whose parts are securely locked together.

When lever 52 is in its clamping position, shown dotted in Fig. 4, the outer end portion of the lever preferably will be directly in front of a stud 20 so that cylinder 62 of a plunger type of lock, mounted on lever 52, may be depressed into locking engagement with the stud 20, the inner end of the cylinder 62 being recessed for engaging over the outer end of the stud as shown in dotted outline in Fig.

5. The lock may be of a known type whose cylinder 82 springs outward when unlocked.

Demounting of a wheel body from its hub and brake-drum section quickly and easily may be accomplished by reversing the procedure as described for its mounting.

I claim as my invention:

1. A vehicle wheel comprising a hub section adapted to be secured on an axle to rotate therewith, a plurality of fixed studs projecting outwardly from the hub section, a wheel body removably mounted on said hub section and having openings therein through which said studs extend, a locking ring on the wheel body and rotatable relative to the wheel body into locking engagement with all of said studs simultaneously, and a second ring on the wheel body mounted for both axial and rotational movement relative to said wheel body and said locking ring for clamping said locking ring against movement out of said locking engagement with the studs and simultaneously clamping the wheel body against said hub section.

2. A vehicle wheel comprising a hub section adapted to be secured on an axle to rotate therewith, a plurality of fixed studs projecting outwardly from the hub section, a wheel body removably mounted on said hub section and having openings therein through which said studs extend, said studs each having an annular peripheral groove at an outer end portion thereof, a locking ring mounted on the wheel body and having a plurality of bayonet slots therein through the larger portions of which said grooved end portions of the studs are adapted to extend when the wheel body is being mounted on the hub section, said locking ring being movable relative to the wheel body to engage the reduced portions of the studs at said grooves simultaneously in the smaller portions of said bayonet slots, and means for spreading apart said wheel body and said locking ring respectively against said hub section and against walls of the annular grooves in said studs thereby to secure the hub section, wheel body and locking ring against relative movement.

3. A vehicle wheel comprising a hub section adapted to be secured on an axle to rotate therewith, a plurality of fixed studs projecting outwardly from the hub section, a wheel body removably mounted on said hub section and having openings therein through which said studs extend, a locking ring movably mounted on the wheel body, there being coacting means on said studs and on said locking ring whereby said locking ring is movable into and out of simultaneous locking engagement with all of said studs, and a cam ring on the wheel body and rotatable independently of rotation of said wheel body and said locking ring, there being coacting means on said wheel body and cam ring for clamping said locking ring in its locking engagement with said studs and for simultaneously clamping said wheel body to said hub section.

4. A vehicle wheel comprising a hub section adapted to be secured on an axle to rotate therewith a wheel body mounted on said hub section, coacting means on said hub section and said wheel body preventing relative rotation thereof, said coacting means comprising a series of studs fixed on the hub section and extending through and beyond the wheel body, a slotted ring member mounted on the wheel body and capable of both axial and rotational movements thereon, said slotted ring member being arranged with a said stud of the hub section extending through each slot of the ring member and being movable between a position in which said hub section and said wheel body are maintained against separation and a position in which the said wheel body is readily separable from said hub section, and a cam ring separately rotatable on the wheel body for clamping said slotted ring member in the first said position with the wheel body secured against separation from the hub section.

5. A vehicle wheel comprising a hub section adapted to be secured on an axle to rotate therewith, means rigid on said hub section and projecting outwardly therefrom, a wheel body removably mounted on said hub section, said outwardly projecting means on the hub section preventing rotation of the wheel body on the hub section, locking means mounted on the wheel body and movable into locking engagement with said outwardly projecting means on the hub and simultaneously at a plurality of locations around the hub, a cam ring rotatable on the wheel body, and leverage means operable to rotate the cam ring for clamping the locking means in its said locking engagement.

6. A vehicle wheel comprising a hub section adapted to be secured on an axle to rotate therewith, a plurality of fixed studs projecting outwardly from the hub section, a wheel body removably mounted on said hub section and having openings therein through which said studs extend, an inwardly facing shoulder on each stud at an other end region thereof, a locking member on the wheel section and movable into and out of simultaneous locking relation to said shoulders of all of the studs, and a cam ring rotatable on the wheel body for camming said locking member against said shoulders when it is in its said locking relation thereto and for simultaneously camming said wheel body against said hub section.

7. A vehicle wheel comprising a hub section adapted to be secured on an axle to rotate therewith, a plurality of fixed studs projecting outwardly from the hub section, a wheel body removably mounted on said hub section and having openings therein through which said studs extend, an inwardly facing shoulder on each stud at an outer end region thereof, a locking ring movably mounted on the wheel body and movable into and out of simultaneous locking relation to said shoulders of all of the studs, a cam ring movably mounted on the wheel body, and means for moving the cam ring to clamp said locking ring against said shoulders of the studs and to clamp said wheel body against said hub section.

8. A vehicle wheel comprising a hub section adapted to be secured on an axle to rotate therewith, a plurality of fixed studs projecting outwardly from the hub section, a wheel body removably mounted on said hub section and having openings therein through which said studs extend, a locking ring movably mounted on the wheel body, there being coacting means on said studs and on said locking ring whereby said locking ring is movable into and out of simultaneous locking engagement with all of said studs, a cam ring movably mounted on the wheel body, and leverage means for actuating the cam ring to apply inward pressure to the wheel body and outward pressure to said locking ring.

9. A vehicle wheel comprising a hub section adapted to be secured on an axle to rotate therewith, a plurality of fixed studs projecting outwardly from the hub section, a wheel body removably mounted on said hub section and having openings therein through which said studs extend, a locking ring rotatably mounted on the wheel body and having a plurality of bayonet slots therein through whose larger portions said studs are adapted to project when said wheel body is being mounted, each said stud having an annularly grooved outer end providing a reduced diameter portion adapted to fit the smaller portion of a said bayonet slot, and said locking ring being rotatable to simultaneously engage the reduced diameter portions of all of said studs in said smaller portions of the bayonet slots, thereby to lock the wheel body on the hub section, and means including a cam for clamping said locking ring against movement out of locking position.

10. A vehicle wheel comprising a hub section adapted to be secured on an axle to rotate therewith, a plurality of fixed studs projecting outwardly from the hub section, a wheel body removably mounted on said hub section and having openings therein through which said studs extend, a locking ring rotatably mounted on the wheel body and having a plurality of bayonet slots therein through whose larger portions said studs are adapted to project when said wheel body is being mounted, each said stud having an annularly grooved outer end providing a reduced diameter portion adapted to fit the smaller portion of a said bayonet slot, and said locking ring being rotatable to simultaneously engage the reduced diameter portions of all of said studs in said smaller portions of the bayonet slots, thereby to lock the wheel body on the hub section, a cam ring rotatably mounted on the wheel body and also axially slidable thereon, said wheel body having cam surfaces for coaction with the cam ring, and leverage means for rotating the cam ring thereby to effect an axial movement thereof into clamping engagement with said locking ring.

SAMUEL SESERMAN.

REFERENCES CITED

The following references are of record in the file of this patent:

UNITED STATES PATENTS

| Number | Name | Date |
|---|---|---|
| 1,353,511 | Baumgartl | Sept. 21, 1920 |
| 1,947,178 | Wilson | Feb. 13, 1934 |
| 2,008,330 | McGuigan | July 16, 1935 |
| 2,018,190 | Robinson | Oct. 22, 1935 |